US010989644B1

(12) United States Patent
Tourek et al.

(10) Patent No.: US 10,989,644 B1
(45) Date of Patent: Apr. 27, 2021

(54) WATER CONTACT ANGLE CALIBRATION STANDARD

(71) Applicant: Seagate Technology LLC, Cupertino, CA (US)

(72) Inventors: Christopher J. Tourek, Bloomington, MN (US); Wasuphin Kaengkham, Nakhon Ratchasima (TH)

(73) Assignee: Seagate Technology LLC, Fremont, CA (US)

( * ) Notice: Subject to any disclaimer, the term of this patent is extended or adjusted under 35 U.S.C. 154(b) by 192 days.

(21) Appl. No.: 16/266,543

(22) Filed: Feb. 4, 2019

Related U.S. Application Data

(60) Provisional application No. 62/628,768, filed on Feb. 9, 2018.

(51) Int. Cl.
*G01N 13/02* (2006.01)
*G11B 5/48* (2006.01)
*G11B 5/127* (2006.01)

(52) U.S. Cl.
CPC .............. *G01N 13/02* (2013.01); *G11B 5/127* (2013.01); *G11B 5/4806* (2013.01); *G01N 2013/0208* (2013.01)

(58) Field of Classification Search
CPC ........... G01N 13/02; G01N 2013/0208; G01N 2013/0241; G01N 2013/0283
USPC .............. 73/1.01, 1.79, 64.48, 64.52; 702/85
See application file for complete search history.

(56) References Cited

U.S. PATENT DOCUMENTS 8,474,306 B1 * 7/2013 Behroozi ............... G01N 13/02
 73/64.52
2019/0285530 A1 * 9/2019 Behroozi .................. G06T 7/64

OTHER PUBLICATIONS

Woodward, "Contact Angle Measurements Using the Drop Shape Method", (8 pages), http://www.firsttenangstroms.com/pdfdocs/CAPaper.pdf.
"Latex Beads", retrieved on Nov. 16, 2017 via https://www.sigmaaldrich.com/labware/labware-products.html?TablePage=17557640, (3 pages).
"Polybead® Polystyrene Microspheres", Technical Data Sheet 238, Polysciences, Inc., May 16, 2013, (4 pages).
Noordmans et al., "The influence of droplet volume and contact angle on liquid surface tension measurements by axisymmetric drop shape analysis-profile (ADSA-P)", Colloids and Surfaces, vol. 58, Issue 3, pp. 239-249, Sep. 27, 1991, Abstract only, (3 pages), https://www.sciencedirect.com/science/article/abs/pii/016666229180224C.
Williams et al., "Computerised Measurement of Contact Angles", Oct. 2010, (11 pages), https://www.shsu.edu/~chm_dlw/Williams-Kuhn-et-al-2010-Galvanotechnik.pdf.

* cited by examiner

*Primary Examiner* — Benjamin R Schmitt
(74) *Attorney, Agent, or Firm* — Kagan Binder, PLLC

(57) ABSTRACT

A calibration standard for calibrating a tool for measuring the surface energy of a data storage component is prepared by providing a standardized sized, dimensionally stable bead having a diameter selected from a length of from 1 to 100 μm and depositing the bead on a surface of a substrate and adhering the bead to the surface with an adhesive. The calibration standard made by these processes is also contemplated.

20 Claims, 3 Drawing Sheets

WATER CONTACT ANGLE CALIBRATION STANDARD

BACKGROUND

The present disclosure relates to preparation of a calibration standard for calibrating water contact angles.

Examples of data storage components include components of hard disk drive systems (HDDs). HDDs include one or more magnetic data storage disks. HDDs are data storage devices that include one or more rotatable disks to which data is written and read by way of one or more transducing heads. A transducing head carried by a slider assembly near the disk is used to read from or write to data tracks on the magnetic disk while the disk spins. The slider assembly includes a transducing read head, a transducing write head, or both, along with a "slider element" that includes a surface that faces the spinning disk and acts as an "air bearing" relative to the spinning disk to permit smaller fly heights and close slider proximity to the disk surfaces. In embodiments, the head slider is provided with surfaces having specified surface tension requirements for desired operation.

Measurement of surface tension of various surfaces in data storage devices can be carried out by a number of techniques, most notably by evaluation of the contact angle of drops of certain liquids placed on the surface. As part of the process of carrying out a conventional surface tension measurement, one normally calibrates the instrument that measures the contact angle of a drop.

SUMMARY

It has been found that calibration of the tools used to measure the surface energy of a hard disk drive head component is challenging, because the drops desirably used to determine the contact angle of the liquid on such surfaces are very small. In particular, the tools used to carry out such surface energy measurements are micro water contact angle tools which use, for example, water drops that are about 50 um in diameter. These very small liquid drops evaporate in seconds. Water droplets therefore cannot be used to calibrate these instruments, because the droplet is gone before calibration or correlation of the tools can be carried out.

Conventional surface tension measurements are taken using drops having relatively large diameters, i.e. on the order of 4 to 6 mm in diameter. Instruments used to take such surface tension measurements may be calibrated using liquids of standard purity on standard surfaces, or in the alternative using sapphire or ruby beads having a diameter of, for example, 4 to 6 mm. Beads used for calibration of conventional measurement tools are much too large to be used in calibrating a tool for measuring the surface energy of very small components of data storage devices. Appropriate small beads for calibration of very small components of data storage devices have heretofore not been identified, and handling of very small beads in the environment of such specialized calibration tools presents significant technical challenges that must be overcome.

It has been found a calibration standard for calibrating a tool for measuring the surface energy of a component of a data storage device (such as a hard disk drive head component) can be prepared by providing a standardized sized, dimensionally stable bead having a diameter selected from a length of from 1 to 100 μm, applying an adhesive to the standardized sized, dimensionally stable bead; and depositing the bead on a surface of a substrate to adhere the bead to the surface.

DETAILED DESCRIPTION

Figure 1:
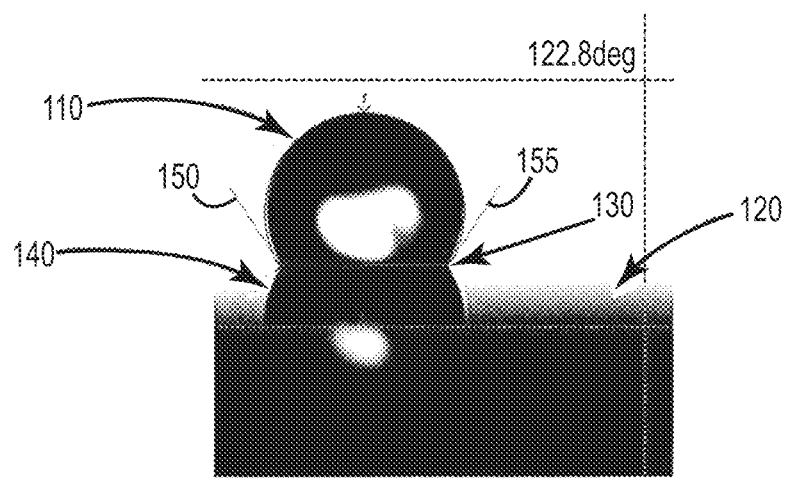
FIG. 1 is a photographic side view of a water droplet as viewed through a water contact angle tester.

FIG. 1 shows water droplet 110 as viewed through a water contact angle tester. Water droplet 110 is on substrate surface 120, wherein the contact line 130 of water droplet 110 with substrate surface 120 is determinable as the interface, visible as an inflection point, where the water drop reflection 140 meets water droplet 110. Contact angle lines 150 and 155 are established by determining the angle of the water bead surface at the point of contact of water droplet 110 with substrate surface 120.

Figure 2:
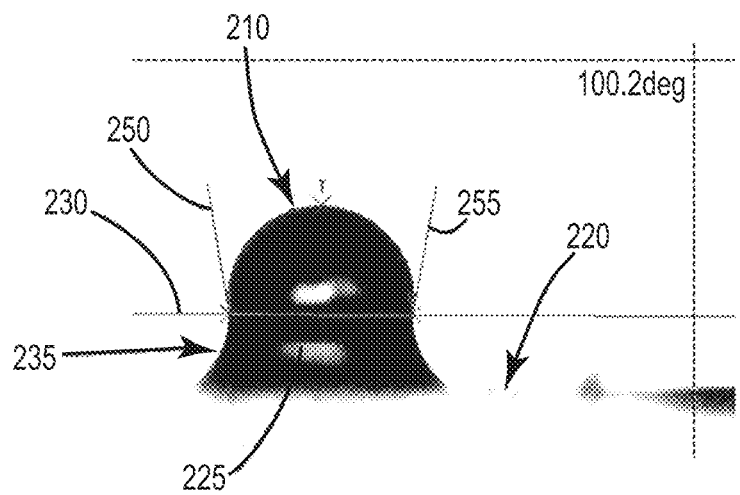
FIG. 2 is a photographic side view of a bead adhesively adhered to a surface of a substrate as viewed through a water contact angle tester.

FIG. 2 shows bead 210 as viewed through a water contact angle tester. Bead 210 is adhered to substrate surface 220 by adhesive 225. Adhesive 225 wets out and bonds to substrate surface 220, and forms a connective adhesive bridge 235 between substrate surface 220 and bead 210. Connective adhesive bridge 235 presents a visible profile of a broad base, with the line 230 where the adhesive 225 ends and the bead 210 begins being determinable as an inflection point in the shape of the apparent profile. The angle of any tangent to the bead (such as tangent lines 250 and 255) relative to a reference line, such as the substrate surface 220 or a perpendicular to the substrate surface 220, can be determined because the profile attributable to bead 210 itself can be readily distinguished from that of connective adhesive bridge 235 in this manner. During calibration, a tangent line of the bead is used to calibrate the instrument to assure that angles are properly measured by the instrument in later water contact angle determinations.

For purposes of the present invention, a bead is considered to be of a standardized size if it has a coefficient of variance that is less than or equal to 10% of the indicated diameter. In an embodiment, the bead has a coefficient of variance that is from about 0.1% to about 10% of the indicated diameter. In an embodiment, the bead has a coefficient of variance that is from about 0.5% to about 5% of the indicated diameter. In an embodiment, the bead has a coefficient of variance that is from about 1% to about 3% of the indicated diameter.

For purposes of the present invention, a bead is considered to be dimensionally stable if it retains its spherical shape at a temperature of 100° C. for a time of 20 minutes. In an embodiment, the bead retains its spherical shape at a temperature of 110° C. for a time of 20 minutes. In an embodiment, the bead retains its spherical shape at a temperature of 120° C. for a time of 20 minutes. In an embodiment, the bead retains its spherical shape at a temperature of 130° C. for a time of 20 minutes.

In an embodiment, the bead has a diameter of from 5 to 90 µm. In an embodiment, the bead has a diameter of from 15 to 80 µm. In an embodiment, the bead has a diameter of from 25 to 70 µm. In an embodiment, the bead has a diameter of from 30 to 60 µm.

In an embodiment, the bead has a refractive index of from about 1.1 to 1.8. In an embodiment, the bead has a refractive index of from about 1.2 to 1.5. In an embodiment, the bead has a refractive index of from about 1.3 to 1.4. For purposes of the present invention, refractive index is measured at 20° C. with light taken at the "yellow doublet" sodium D line, with a wavelength of 589 nanometers. In an embodiment, the bead has an extinction coefficient (k) of from about 8e-9 to 8e-9. In an embodiment, the refractive index (n) and extinction coefficient (k) is selected to be within about 10% of the refractive index (n) and extinction coefficient (k) of water, in order to make the bead look like a water droplet to the camera.

In an embodiment, the bead is a polymeric microsphere. In an embodiment, the bead is a polystyrene microsphere. Polystyrene microspheres are commercially available, for example, from Polysciences, Inc., Warrington, Pa. In an embodiment, the bead is a latex bead. In an embodiment, the bead is an epoxy bead. In an embodiment, the bead is a glass microsphere. In an embodiment, the bead is made from a material selected from barium titanate glass, borosilicate glass, polyethylene, polymethyl methacrylate, silica, soda lime glass, titanium dioxide, yttria stabilized zirconia, and zirconia. Examples of such materials are commercially available, for example, from Cospheric LLC, Santa Barbara, Calif.

In an embodiment, the bead is at least partially light transmissive. In an embodiment, the bead is opaque.

When preparing the calibration standard, the bead is adhered to the surface of a substrate with adhesive. The substrate having the bead adhered thereto is ready for placement in the surface energy measurement tool for calibration of the tool.

The bead and adhesive are manipulated by using any suitable micro-product handling device, such as the Nano eNabler™ system, which is commercially available from Bioforce Nanosciences. The Nano eNabler™ system dispenses small volumes of liquids and particles using a unique microchannel delivery system that delivers small volumes of liquids using capillary delivery. Particles can be delivered from a liquid matrix or solid delivery techniques such as by electrostatic attraction. Other microdelivery systems may likewise be employed, such as systems that use microprinter technology and micropipetting technology.

In an embodiment, the bead is adhered to the surface by depositing the adhesive on the surface and contacting the bead to the applied adhesive, thereby bonding the bead to the surface. In an embodiment, the bead is adhered to the surface by applying an aliquot of adhesive to a portion of the bead and depositing the bead comprising the aliquot of adhesive on the surface, thereby bonding the bead to the surface. In an embodiment, the bead is adhered to the surface by contacting the bead to the adhesive, thereby applying an aliquot of adhesive to a portion of the bead and depositing the bead comprising the aliquot of adhesive on the surface, thereby bonding the bead to the surface.

In an embodiment, the adhesive is selected from a pressure-sensitive adhesive. In an embodiment, the adhesive is a chemically curable adhesive. In this embodiment, the adhesive is prepared with a timed cure reaction, so that the adhesive finally cures when the bead is in place on the surface. In an embodiment, the adhesive is a light-cured adhesive. In this embodiment, the bead is placed with the adhesive on the surface, and the construction is exposed to light in an amount sufficient to cure the adhesive when the bead is in place on the surface. In an embodiment, the adhesive is an epoxy adhesive. In an embodiment, the adhesive is an acrylate adhesive. In an embodiment, the adhesive is a cyanoacrylate adhesive.

In an embodiment, the substrate is glass. In an embodiment, the substrate is made from the same material as the hard disk drive head component to be tested. In an embodiment, the substrate is metal.

Figure 3:
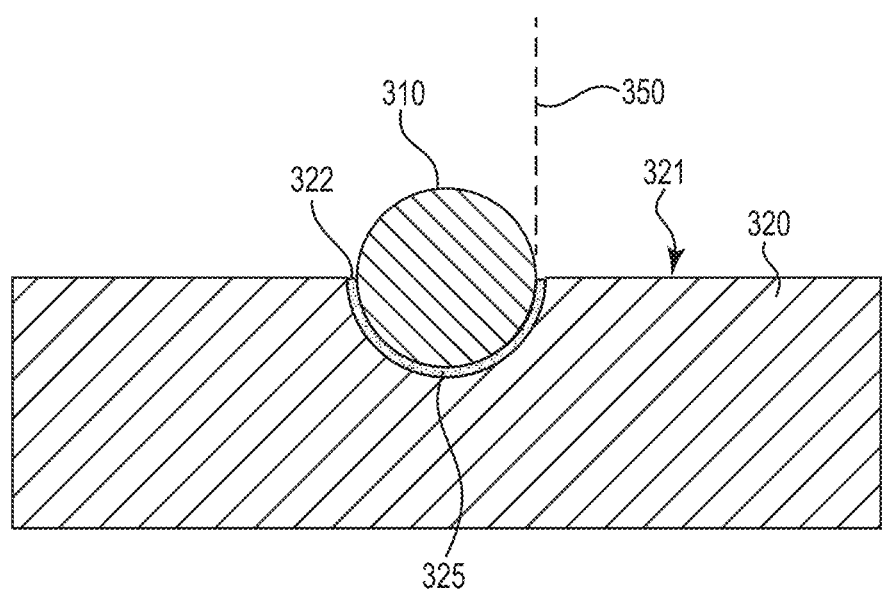
FIG. 3 is a cross-sectional side view of an embodiment of a bead adhesively adhered to a substrate comprising a recess.

In an embodiment, a surface of the substrate comprises a recess, and the bead is adhered in the recess by an adhesive. In an embodiment, the adhesive is not visible in the apparent profile of the calibration standard during contact angle calibration. In an embodiment, the apparent profile of the bead in the recess during contact angle calibration is a half-sphere. For illustration purposes, FIG. 3 is a cross-sectional side view of an embodiment wherein a bead 310 is adhesively adhered to substrate 320 comprising recess 322 sized to accommodate bead 310. Bead 310 is adhesively adhered to substrate 320 by adhesive 325. When viewed through a water contact angle tester, the technician will not be able to see adhesive 325, but instead will be able to readily identify tangent line 350 at the point of intersection with substrate surface 321. In an embodiment, the recess is smaller than the bead such that more than one half of the bead is visible in the apparent profile of the calibration standard during contact angle calibration. This embodiment is advantageous for calibration of a contact angle that is greater than 90 contact angle measurement.

Figure 4:
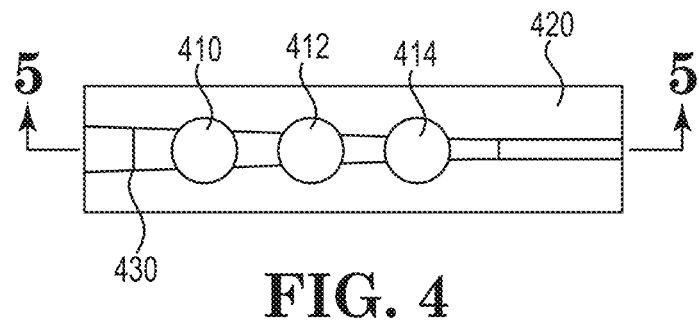
FIG. 4 is a top view of an embodiment wherein a plurality of beads are adhesively adhered to a substrate comprising a recess trench sized to accommodate the beads.

FIG. 4 is a top view of an embodiment wherein first bead 410, second bead 412 and third bead 414 are adhesively adhered to substrate 420 comprising recess trench 430 sized to accommodate bead 410.

Figure 5:
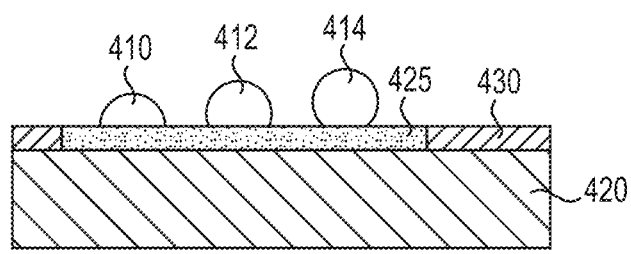
FIG. 5 is a cross-sectional side view of the embodiment shown in FIG. 4.

FIG. 5 is a cross-sectional side view of the embodiment of FIG. 4 taken along section line 4-4, wherein first bead 410, second bead 412 and third bead 414 are adhesively adhered to substrate 420 by adhesive 425 at recess trench 430. Recess trench 430 is sized so that first bead 410 is at a lower level than second bead 412, which in turn is at a lower level than third bead 414. In a different embodiment, the recess trench may be of uniform size, with multiple beads being pushed down in the adhesive to different levels prior to cure of the adhesive.

Figure 6:
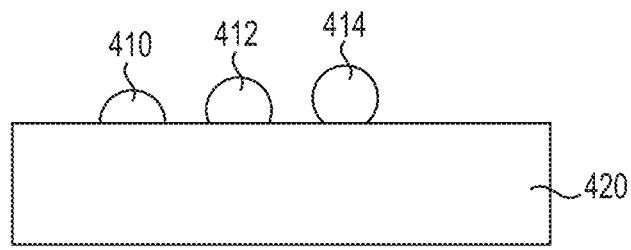
FIG. 6 is a side view of the embodiment shown in FIG. 4.

FIG. 6 is a side view of the embodiment of FIG. 4, showing that the profile of first bead 410, second bead 412 and third bead 414 as visible in the apparent profile of the calibration standard during contact angle calibration. By having multiple beads at different levels on the same calibration standard, the technician and at one set-up calibrate multiple angles by directing the camera from one bead to another. Calibration of different angles can be carried out without the need to place a new calibration standard in the tool and refocus the camera, or to have an inventory of various bead sizes or configurations.

In an embodiment, the surface of the substrate is provided with a recess by chemical etching. In an embodiment, the surface of the substrate is provided with a recess by micromachining. In an embodiment, the surface of the substrate is provided with a recess having a diameter of from 1 to 120 µm and a depth of from 1 to 120 µm.

In an embodiment, the surface of the substrate is provided with a recess trench having a width of from 1 to 120 µm and a depth of from 1 to 120 µm. In an embodiment, the width of the recess trench is uniform along the entire length of the trench. In an embodiment, the width of the recess trench is wider in at least one portion of the trench than the other to facilitate placement of a plurality of beads at different levels on the same calibration standard.

In an embodiment, a calibration standard for calibrating a tool for measuring the surface energy of a hard disk drive head component prepared by any of the above described processes is additionally provided.

The calibration standard as described herein is used by placing the calibration standard as described herein in a surface tension measurement instrument, identifying the profile of the bead, as differentiated from the profile of the adhesive, and determining and verifying observed measurements of various angles as determined by the instrument based on the known values of the bead of the calibration standard. The procedures for calibrating a surface tension measurement instrument using the present calibration standard will now be readily understood by the skilled practitioner based on the information provided herein.

What is claimed is:

1. A process of preparation of a calibration standard for calibrating a tool for measuring the surface energy of a data storage component comprises:
   providing a standardized sized, dimensionally stable bead having a diameter of from 1 to 100 μm; and
   depositing the bead on a surface of a substrate and adhering the bead to the surface with an adhesive.

2. The process of claim 1, comprising the steps of:
   depositing the adhesive on the surface; and
   contacting the bead to the applied adhesive, thereby bonding the bead to the surface.

3. The process of claim 1, comprising the steps of:
   applying an aliquot of adhesive to a portion of the bead; and
   depositing the bead comprising the aliquot of adhesive on the surface, thereby bonding the bead to the surface.

4. The process of claim 1, comprising the steps of:
   contacting the bead to the adhesive, thereby applying an aliquot of adhesive to a portion of the bead; and
   depositing the bead comprising the aliquot of adhesive on the surface, thereby bonding the bead to the surface.

5. The process of claim 1, wherein the bead is a polymeric bead.

6. The process of claim 1, wherein the bead is selected from the group consisting of a polystyrene bead, a latex bead, an epoxy bead and a glass bead.

7. The process of claim 1, wherein the bead has a refractive index of from about 1.1 to 1.8.

8. The process of claim 1, wherein the bead has a diameter of from 30 to 60 μm.

9. The process of claim 1, wherein the bead has a coefficient of variance that is from about 0.5% to about 5% of the diameter of the bead.

10. The process of claim 1, wherein the bead retains its spherical shape at a temperature of 120° C. for a time of 20 minutes.

11. The process of claim 1, wherein the adhesive is selected from a pressure-sensitive adhesive.

12. The process of claim 1, wherein the adhesive is selected from a chemically curable adhesive.

13. The process of claim 1, wherein the adhesive is selected from a light-cured adhesive.

14. The process of claim 1, wherein the adhesive is selected from the group consisting of an epoxy adhesive, an acrylate adhesive and a cyanoacrylate adhesive.

15. The process of claim 1, wherein the substrate is a glass substrate.

16. The process of claim 1, wherein the substrate is a metal substrate.

17. The process of claim 1, wherein the surface comprises a recess, and the bead is adhered in the recess by the adhesive.

18. The process of claim 17, wherein the adhesive is not visible in the apparent profile of the calibration standard during contact angle calibration.

19. The process of claim 1, wherein the surface comprises a recess trench having a width of from 1 to 120 μm and a depth of from 1 to 120 μm, and a plurality of beads are adhered in the recess trench by the adhesive.

20. The calibration standard made by the process of claim 1.

* * * * *